Feb. 23, 1932.      C. T. MACFARLANE      1,846,400
RANGE BOILER REPAIR PLUG
Filed March 3, 1930
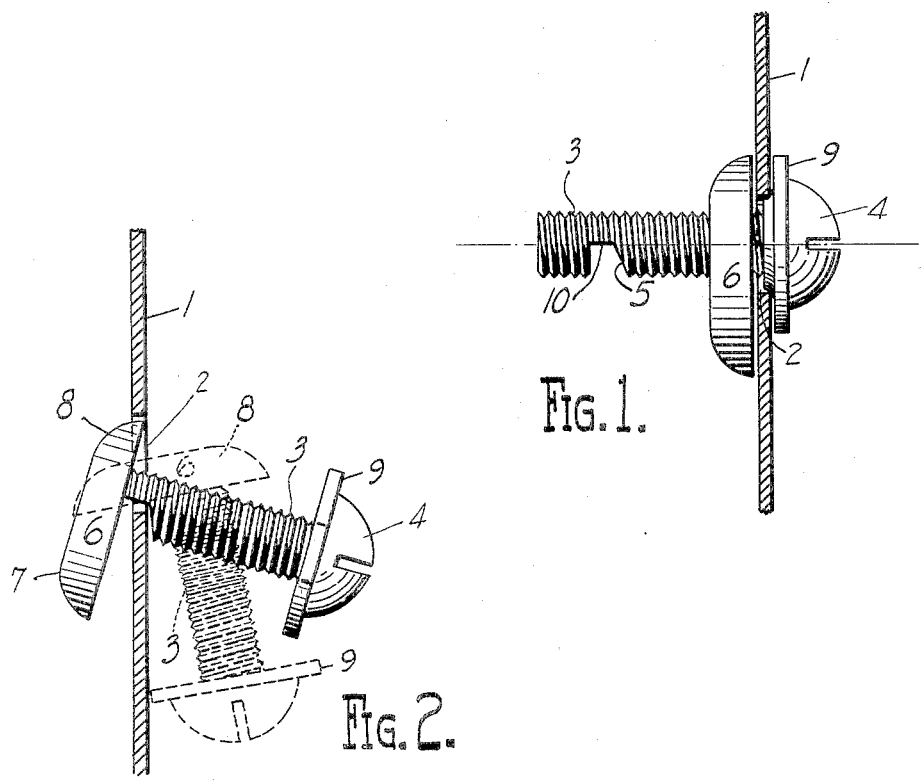
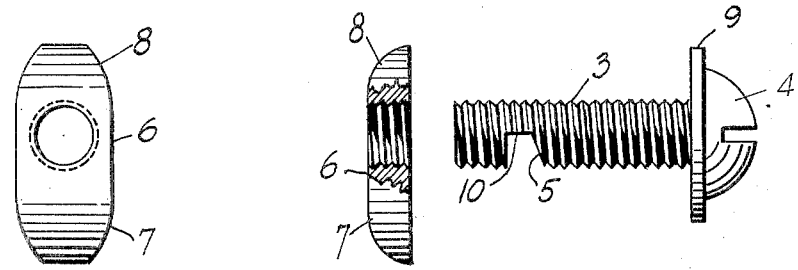
INVENTOR
CLAUDE T. MACFARLANE
BY
*James D. Girnan*
ATTORNEY Patented Feb. 23, 1932

1,846,400

UNITED STATES PATENT OFFICE

CLAUDE T. MACFARLANE, OF SEATTLE, WASHINGTON

RANGE BOILER REPAIR PLUG

Application filed March 3, 1930. Serial No. 432,627.

This invention relates to improvements in boiler repair plugs and has for its principal object to provide a repair plug of this character which is adapted to quickly and conveniently seal a puncture or leak in the shell of a range boiler, or the like, which may have been caused by rust, defects, or the like.

This and other objects will appear as my invention is more fully hereinafter described in the following specification, illustrated in the accompanying drawings, and finally pointed out in the appended claims.

In the drawings:

Figure 1 is a sectional view of a fragment of punctured boiler plate showing my improved form of repair plug in operative engagement therewith.

Figure 2 is a view showing the method of inserting one end of the plug into a hole in the boiler plate under repair.

Figure 3 is a view showing the parts of the repair plug in position for assembly.

Figure 4 is a plan view of an elongated nut which, as shown, is formed with a long end and a short end.

Referring now more particularly to the drawings:

Reference numeral 1 indicates a fragment of boiler plate having a puncture or leak, as shown at 2.

The main body of my repair plug consists of a threaded bolt 3 having a tool receiving head 4 at one of its ends. Near the opposite end of the bolt 3 a notch 5 is formed, the depth of which extends slightly beyond the longitudinal center-line of the bolt. An elongated nut 6 is provided for the bolt. This nut, as shown in Figures 3 and 4, is formed with a long end 7 and a short end 8. The width of the nut is equal to the distance between the bottom of the notch, indicated by reference numeral 10, and the outermost end of the short end 8 of the nut. These dimensions are purposely arranged so that the entire nut may be inserted through an aperture or puncture in the boiler plate whose diameter is substantially equal to the width of the nut. The length of the nut is, of course, greater than the diameter of the aperture or puncture so that its length will extend across and overlap the edges of said aperture on the inner side of the boiler, as shown in Figure 1.

A washer 9 of soft metal, such as lead or the like, is provided for insertion between the head 4 of the bolt 3 and the boiler plate 1, so that as the bolt is advanced on the threads of the nut in effecting repairs to a boiler, the central portion of the washer 9 will be forced inwardly over the edges of the aperture 2 to thereby effectively seal it, as shown in Figure 1.

The operation of the device is as follows:

In order to insert the nut 6 and bolt 3 through an aperture or puncture, the nut is first presented to the aperture in the position shown in dotted lines in Figure 2 with the long end of the nut first entering the aperture until the body of the bolt 3 nearly parallels the boiler plate. Then the bolt is swung upwardly into full line position shown in Figure 2 during which movement the short end 8 of the nut will clear the edges of the aperture, thus enabling the entire nut to pass through the aperture. In this operation it will be noted that the notch 5 now straddles the edge of the aperture which thereby lowers the bolt with respect to the center of the aperture to such extent that the short end of the nut along with the bolt is free to pass in a curved path through the aperture. When the nut is thus located on the inside of the boiler its long end 7 being heavier than the short end will cause the nut to position itself vertically by gravity and remain in that position while the bolt 3 is advanced through the threads of the nut.

When the bolt is entirely advanced, as shown in Figure 1, and the nut 6 and washer 9, backed by the head 4 of the bolt, firmly abut the boiler plate, the washer due to its softness will obviously be forced inwardly over the edges of the aperture to thereby form a water-tight seal.

While I have shown a particular form of embodiment of my invention, I am aware that many minor changes therein will readily suggest themselves to others skilled in the art without departing from the spirit and scope of the invention. Having thus described the invention, what I claim as new and desire to protect by Letters Patent is:—

1. A repair plug of the class described comprising a bolt with a tool receiving head at one of its ends, a notch near the other end of said bolt which is cut to a depth approximately equal to one half the diameter of the bolt and spaced at a distance from the end of the bolt approximately equal to the thickness of an elongated nut having a long end and a short end and which is adapted for threaded engagement with said bolt.

2. A repair plug of the class described comprising a bolt with a tool receiving head at one of its ends, a notch formed in the shank of said bolt near its opposite end, an elongated nut having a long end and a short end and adapted for threaded engagement with said bolt, the width of said nut being equal to the distance between the bottom of said notch and the short end of said nut, so that the nut when carried by the bolt can be passed through an aperture to be repaired which is substantially equal in diameter to the width of the nut.

3. A repair plug of the class described comprising a bolt with a tool receiving head at one of its ends, a notch formed in the shank of said bolt near its opposite end, a packing washer carried by the shank of said bolt, an elongated nut having a long end and a short end and adapted for threaded engagement with said bolt, the width of said nut being equal to the distance between the bottom of said notch and the short end of said nut so that the nut when carried by the bolt can be passed through an aperture to be repaired which is substantially equal in diameter to the width of the nut, the long end of said nut being adapted by gravity to hang down vertically with respect to said aperture so that the bolt may be advanced through the nut without a grip on said nut when on the inside of a boiler under repair.

4. A repair plug of the class described comprising a bolt with a tool receiving head at one of its ends, a notch formed in the shank of said bolt near its opposite end, a soft metal packing washer carried by the shank of said bolt, an elongated nut having a long end and a short end and adapted for threaded engagement with said bolt, the width of said nut being equal to the distance between the bottom of said notch and the short end of said nut so that the nut when carried by the bolt can be passed through an aperture to be repaired which is substantially equal in diameter to the width of the nut, the center portion of said soft metal packing washer adapted to be forced within and completely seal any space between the periphery of the bolt and the inner edges of the aperture under repair.

In testimony whereof I affix my signature.

CLAUDE T. MACFARLANE.